Patented Jan. 10, 1950

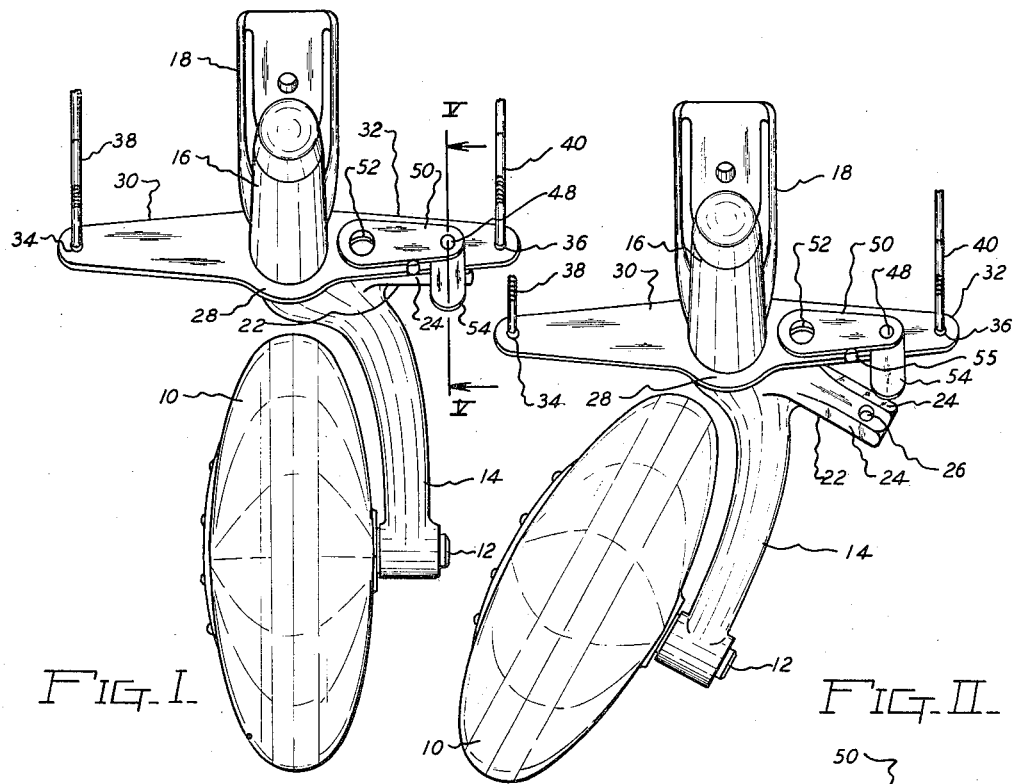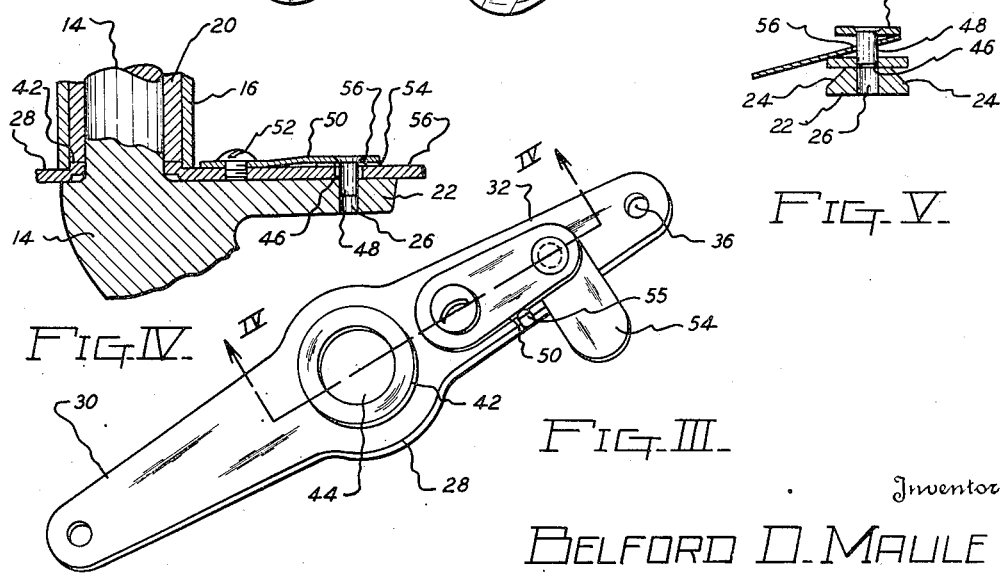

2,494,482

UNITED STATES PATENT OFFICE 2,494,482

STEERABLE AND FULL SWIVELING TAIL WHEEL

Belford D. Maule, Michigan Center, Mich.

Application March 20, 1947, Serial No. 735,927

4 Claims. (Cl. 244—50)

The present invention relates to castering wheels, and more particularly to an improvement in the controlling features of the castering wheels used as tail wheels on airplanes, particularly light airplanes.

At the present time, the manufacturers of light airplanes are facing two definite problems in improving their aircraft. These are: first, the reduction of all unnecessary weight in the airplane structure without the weakening of that structure; and second, the reduction of cost in the manufacture of the component parts of these small aircraft so that the selling price may be materially reduced. For the purpose of aiding in the solution of these two problems, I have developed a new and simplified tail wheel mounting structure which allows the tail wheel to be steered from the cockpit of the airplane, and yet which allows the disengagement of this steering feature which is desirable to obtain full castering action of the tail wheel when moving the airplane around on the ground by means of manual power. In the small airplanes of today employing a tail wheel, it is desirable to have this tail wheel steerable for guiding the airplane on the ground under the power of the engine, but it is not absolutely necessary that the tail wheel be a full swiveling tail wheel during operation of the aircraft by means of the engine on the ground. Rather, it is necessary that this full swiveling action be obtained while the airplane is being parked or manhandled into a hangar.

It is an object of this invention to provide for small airplanes a steerable tail wheel mounting of a structure which will allow the release of this steerable feature so that the tail wheel may fully caster during ground operation. It is a further object of this invention to provide a steerable and full swiveling tail wheel mounting which materially reduces the weight of the tail wheel mounting normally used and also the cost of manufacture of that tail wheel mounting.

Further objects and advantages of my invention will be apparent from the following specification when considered in connection with the appended claims and the accompanying drawings, in which Fig. I is a perspective view of a tail wheel mounting constructed according to this invention with the mounting shown in the locked or steerable position, Fig. II is a similar view in perspective with the mounting shown in the unlocked or full castering position, Fig. III is a detail view in perspective of the steering bracket and associated structure, Fig. IV is a view in section on the line IV—IV of Fig. III, with the swivel arm and post added in broken section, and Fig. V is a detail view in section on the line V—V of Fig. I.

In the drawings, the tail wheel 10 is shown as rotating around the usual axle 12 which is journalled in the normal swivel arm 14. The swivel arm 14 is telescopically received within a swivel post 16, which is attached to the frame structure of the airplane by any kind of an attachment bracket 18. The bearings 20 allow free rotation of the swivel arm 14 in the swivel post 16 as may be seen in Fig. IV.

In the present embodiment of the invention, a locking arm 22 with sloping cam acting side surfaces 24 has been formed as an integral part of swivel arm 14 and positioned so as to be perpendicular to the longitudinal axis of the airplane. Defined near the outer extremity of this locking arm 22 is an aperture 26 the function of which will appear later. This locking arm 22 could as well be formed as a piece separate from swivel arm 14, but it must be in co-acting relationship with swivel arm 14.

A steerable connection is provided to the tail wheel by a steering bracket 28 formed with steering arms 30 and 32 which are in turn provided with the apertures 34, and 36 into which are connected cables 38 and 40 which extend forward to the cockpit of the airplane for control by the pilot. For the purpose of holding steering bracket 28 in the desired position, I have formed it with a drawn shoulder 42 and a centrally located aperture 44 in such a way that the aperture 44 may be received over the upper end of the swivel arm 14 and the swivel post 16 will fit down snugly over the shoulder 42 when the parts are assembled. Defined in the arm 32 in alignment with aperture 26 in locking arm 22 is an aperture 46 adapted to receive a locking pin 48. It will be readily apparent that with the pin 48 engaged in apertures 46 and 26 that locking arm 22 and steering bracket 28 will rotate together around swivel post 16. It is also apparent that movement of cables 38 and 40 will cause steering bracket 28 and the tail wheel 10 to rotate relative to swivel post 16. The amount of swiveling thus obtained will be governed in no way by the tail wheel mounting but will be entirely governed by the travel available in the controls in the cockpit.

In order to provide retention and removal means associated with the pin 48, I have provided a resilient strip 50 held in position by screw 52. The pin 48 is secured to the free end of resilient strip 50 and is movable within the apertures 46 and 26. To provide manual means for disengaging pin 48 from aperture 26, I have provided a lever 54 which is inserted under the resilient strip 50 and which is provided with an aperture 56 to allow the passage of the pin 48. A lug 55 punched up from the steering arm 32 prevents the lever 54 from pushing around under the resilient strip 50.

In normal operation of the airplane on the ground with power supplied by the engine, the parts will be in the position shown in Fig. I, with the locking arm and swivel arm being controlled by the steering bracket 28. After the airplane has been stopped, and it is desired to move it, either into a hangar or into some other desired place by the use of manual power, the outer end of lever 54 is pressed, thereby raising pin 48 out of engagement with aperture 26 against the tension of the resilient strip 50, allowing locking arm 22 to move away from steering bracket 28 and allowing the tail wheel to swivel fully about the swivel post 16. However, when the tail wheel mounting approaches the centered position, the pin 48 strikes one of the tapered or beveled camming edges 24 of locking arm 22 and rides up that edge, against the tension of the resilient strip 50, and when the apertures 46 and 26, are aligned, the pin 48 will drop into aperture 26, thereby locking the tail wheel mounting so that the airplane may be steered from the cockpit of the airplane.

I recognize that it would be possible to construct a steering bracket in my tail wheel mounting in various forms so that arms 30 and 32 would not be parallel, and that it would also be possible to position locking arms 22 above the steering bracket 28 rather than below as shown in my drawings, but these and other similar changes may be made without departure from the spirit of my invention.

Having thus described my invention, what I claim as new and desire to protect by Letters Patent is:

1. An airplane tail mounting comprising a wheel, an axle on which said wheel is free to rotate, a swivel arm on which said axle is mounted, a swivel post having at one end a bracket for holding said swivel post on an airplane, a locking arm mounted on said swivel arm, a steering bracket mounted on said swivel post adjacent said locking arm and said swivel arm, an aperture defined in said locking arm, an aperture defined in said steering bracket concentric to said first aperture, a resiliently urged stud received in said two apertures to maintain said locking arm and said steering bracket in parallel relationship, and a lever mounted upon said steering bracket and bodily movable therewith for moving said stud out of said first aperture to allow said locking arm and said swivel arm to turn independently.

2. In an airplane tail wheel mounting a swivel post attached by a suitable bracket to the airplane, a swivel arm freely rotatable in said swivel post, a wheel mounted on said swivel arm, a steering bracket mounted on said swivel arm and freely rotatable on said swivel arm, a locking arm mounted on said swivel arm and movable therewith, said locking arm being parallel to said steering bracket when the controls of the airplane are neutral and said wheel is parallel to the longitudinal axis of said airplane, an aperture defined in said locking arm, an aperture alignable with said first aperture defined in said steering bracket, a movable pin received in said apertures to cause said locking arm to move with said steering bracket, means supporting said pin from one of said elements having an aperture therein, lever means for removing said pin from engagement with said first aperture, thereby allowing said locking arm to swivel without the movement of said steering bracket, said lever means being mounted upon one of said elements locked by said pin for bodily movement therewith.

3. In a full swiveling tail wheel for airplanes, a swivel arm on which a wheel is mounted, a swivel post in which said swivel arm is mounted, attachment structure for holding said swivel post on the airplane, a locking arm fastened to and movable with said swivel arm, a controlled steering bracket rotatably mounted concentric to said swivel post, a pair of aligning apertures defined in said steering bracket and said locking arm, a movable pin receivable in said apertures to cause said steering bracket and said locking arm to move together, lever means for disengaging said pin from one of said apertures to allow independent movement of said locking arm and said steering bracket, a resilient arm supporting said pin and mounted upon one of said elements having apertures defined therein, said lever means engaging said arm and being bodily carrried and movable with the element supporting said resilient arm.

4. In an airplane tail wheel mounting, a locking arm fixed relative to the tail wheel, an aperture defined in said arm, a steering bracket pivotally mounted in juxtaposition with said locking arm, an aperture defined in said steering bracket and alignable with said first aperture, a locking pin removably received in said apertures to cause said arm and said steering bracket to rotate together, and lever means associated with said locking pin and supported upon said steering bracket for bodily movement therewith to disengage said locking pin from one of said apertures.

BELFORD D. MAULE.

REFERENCES CITED

The following references are of record in the file of this patent:

UNITED STATES PATENTS

| Number | Name | Date |
| --- | --- | --- |
| 271,251 | Leerbech | Jan. 30, 1883 |
| 608,850 | Folmer | Aug. 9, 1898 |
| 1,550,919 | Milton | Aug. 25, 1925 |
| 2,263,240 | Hise | Nov. 18, 1941 |
| 2,367,649 | Noorduyn | Jan. 16, 1945 |